US007836676B2

(12) United States Patent
Futa, Jr. et al.

(10) Patent No.: US 7,836,676 B2
(45) Date of Patent: Nov. 23, 2010

(54) FUEL METERING VALVE BACK-UP POSITION CONTROL SYSTEM

(75) Inventors: Paul W. Futa, Jr., North Liberty, IN (US); Gregory A. Lafferty, Plymouth, IN (US)

(73) Assignee: Honeywell International Inc., Morristown, NJ (US)

( * ) Notice: Subject to any disclaimer, the term of this patent is extended or adjusted under 35 U.S.C. 154(b) by 841 days.

(21) Appl. No.: 11/757,810

(22) Filed: Jun. 4, 2007

(65) Prior Publication Data
US 2008/0296403 A1    Dec. 4, 2008

(51) Int. Cl.
*F02C 9/00* (2006.01)
(52) U.S. Cl. .................................. 60/39.281; 60/734
(58) Field of Classification Search .............. 60/39.281, 60/734; 251/14
See application file for complete search history.

(56) References Cited

U.S. PATENT DOCUMENTS

| | | | |
|---|---|---|---|
| 3,753,350 A | 8/1973 | Nott | |
| 4,033,112 A * | 7/1977 | Schuster | .................. 60/39.281 |
| 4,248,040 A | 2/1981 | Kast | |
| 4,270,345 A | 6/1981 | Kast | |
| 4,276,809 A | 7/1981 | Kast | |
| 4,344,281 A * | 8/1982 | Schuster et al. | .......... 60/39.281 |
| 4,375,780 A | 3/1983 | Davis | |
| 4,470,337 A | 9/1984 | Kast | |
| 4,608,820 A | 9/1986 | White et al. | |
| 4,718,229 A | 1/1988 | Riley | |
| 5,088,278 A | 2/1992 | Smith et al. | |
| 5,235,806 A | 8/1993 | Pickard | |
| 5,403,155 A | 4/1995 | Head et al. | |
| 5,490,379 A | 2/1996 | Wernberg et al. | |
| 5,555,720 A | 9/1996 | Wernberg et al. | |
| 5,709,079 A | 1/1998 | Smith | |
| 5,735,122 A | 4/1998 | Gibbons | |
| 5,784,884 A | 7/1998 | Poerio et al. | |
| 6,205,766 B1 | 3/2001 | Dixon et al. | |
| 6,401,446 B1 * | 6/2002 | Gibbons | .................. 60/39.281 |
| 6,715,278 B2 | 4/2004 | Demers | |
| 6,912,837 B2 | 7/2005 | Demers | |

(Continued)

OTHER PUBLICATIONS

Futa, P.W.; Wieger, G.S.; Lewis, S.A.; Lafferty, G.A.; Van Oosterum, J.C.; System For Positioning A Piston Including A Fail Fixed Valve For Holding The Piston In Position During A Power Interruption And Method Of Using Same; filed Feb. 28, 2006.

*Primary Examiner*—Michael Cuff
*Assistant Examiner*—Phutthiwat Wongwian
(74) *Attorney, Agent, or Firm*—Ingrassia Fisher & Lorenz P.C.

(57) ABSTRACT

A system allows a user to manually manipulate fuel flow to a gas turbine engine during a loss of power to the fuel supply system fuel metering unit. The fuel metering unit includes a fuel metering valve, a metering valve actuator, a fail-fixed valve, a flow increase valve, and a flow decrease valve. The fuel metering unit is configured such that, upon electrical power interruption to the metering valve actuator, the fail-fixed valve shifts and provides a hydraulic lock on the fuel metering valve, to thereby maintain its position. The flow increase and flow decrease valves are powered from a power source that is independent of that used to power the fuel metering unit and, when appropriately energized will allow movement of the fuel metering valve.

20 Claims, 4 Drawing Sheets

U.S. PATENT DOCUMENTS

| | | |
|---|---|---|
| 7,191,054 B2 | 3/2007 | Machida |
| 2005/0022498 A1 | 2/2005 | Futa, Jr. et al. |
| 2005/0072160 A1* | 4/2005 | Futa et al. .................... 60/773 |
| 2005/0217235 A1* | 10/2005 | Zielinski et al. .......... 60/39.281 |
| 2007/0199314 A1* | 8/2007 | Futa et al. .................... 60/399 |
| 2007/0234732 A1* | 10/2007 | Shelby et al. ................ 60/772 |

* cited by examiner

FUEL METERING VALVE BACK-UP POSITION CONTROL SYSTEM

TECHNICAL FIELD

The present invention generally relates to gas turbine engine fuel control and, more particularly, to a back-up control system for a gas turbine engine fuel metering valve.

BACKGROUND

Typical gas turbine engine fuel supply systems include a fuel source, such as a fuel tank, and one or more pumps that draw fuel from the fuel tank and deliver pressurized fuel to the fuel manifolds in the engine combustor via a main supply line. The main supply line may include one or more valves in flow series between the pumps and the fuel manifolds. These valves generally include at least a main metering valve and a pressurizing-and-shutoff valve downstream of the main metering valve. In addition to the main supply line, many fuel supply systems may also include a bypass flow line connected upstream of the metering valve that bypasses a portion of the fuel flowing in the main supply line back to the inlet of the one or more pumps, via a bypass valve. The position of the bypass valve is controlled to maintain a substantially fixed differential pressure across the main metering valve.

Many aircraft include an engine controller, such as a FADEC (Full Authority Digital Engine Controller), to control engine operation and the fuel supply system. Typically, the engine controller receives various input signals from the engine and aircraft, and a thrust setting from the pilot. In response to these input signals, the engine control system may modulate the position of the above-described fuel metering valve to control the fuel flow rate to the engine fuel manifolds to attain and/or maintain a desired thrust, or, in the case of a turbo prop or turbo shaft engine, a desired speed.

Fuel supply and engine control systems, such as the one described above, may experience certain postulated events that may result in certain postulated failure modes, which in turn may result in certain postulated effects. For example, one particular postulated event is a loss of power. To accommodate this postulated event, the engine control system is typically designed such that, in the highly unlikely occurrence of a loss of power, the fuel metering valve "fails fixed." That is, the fuel metering valve will remain in the position it was in when the postulated loss of power event occurs. As a result, fuel flow to the engine will remain at the flow rate that was commanded with then postulated loss of power event occurs.

Although the above-described "fail fixed" configuration is generally safe and reliable, it is additionally desirable that the pilot be provided with a means to manually manipulate fuel flow to the engine during the loss of power to the metering valve. The present invention addresses at least this need.

BRIEF SUMMARY

The present invention provides a system that allows a pilot to manually manipulate fuel flow to the engine during the loss of power to the fuel metering unit. In one embodiment, and by way of example only, a fuel metering unit includes a fuel metering valve, a metering valve actuator, a fail-fixed valve, a flow increase valve, and a flow decrease valve. The fuel metering valve is adapted to receive a flow of fuel from a fuel source and has a variable area flow orifice through which fuel from the fuel source flows. The fuel metering valve is coupled to receive hydraulic fluid and is operable, upon receipt of the hydraulic fluid, to adjust the area of the variable area flow orifice based in part on the pressure of the hydraulic fluid. The metering valve actuator is adapted to receive fuel flow command signals and hydraulic fluid from one or more hydraulic fluid sources. The metering valve actuator is operable, upon receipt of the fuel flow command signals and the hydraulic fluid, to supply variable pressure hydraulic fluid to the fuel metering valve. The fail-fixed valve is disposed in fluid communication between the metering valve actuator and the fuel metering valve. The fail-fixed valve is movable between a first position, in which the fuel metering valve receives the variable pressure hydraulic fluid from the metering valve actuator, and a second position, in which fuel metering valve does not receive the variable pressure hydraulic fluid from the metering valve actuator. The flow increase valve is in fluid communication with the fuel metering valve, and is adapted to receive hydraulic fluid at a first pressure from a first hydraulic fluid source and to selectively couple the fuel metering valve to the first hydraulic fluid source to thereby increase the area of the variable area flow orifice. The flow decrease valve is in fluid communication with the fuel metering valve, and is adapted to receive hydraulic fluid at a second pressure from a second hydraulic fluid source and to selectively couple the fuel metering valve to the second hydraulic fluid source to thereby decrease the area of the variable area flow orifice.

In another exemplary embodiment, a gas turbine engine fuel supply system includes an engine control, a fuel supply line, and a fuel metering unit. The engine control is operable to supply fuel flow command signals. The fuel supply line has an inlet and an outlet. The inlet is adapted to receive fuel from a fuel source, and the outlet is adapted to supply the fuel to a gas turbine engine combustor. The fuel metering unit is disposed in flow series in the fuel supply line, is coupled to receive the fuel flow command signals and is operable, in response thereto, to control fuel flow from the fuel source to the gas turbine engine combustor. The fuel metering unit includes a fuel metering valve, an actuator, a fail-fixed valve, a flow increase valve, and a flow decrease valve. The fuel metering valve is coupled to receive the flow of fuel from the fuel source and has a variable area flow orifice through which fuel from the fuel source flows. The fuel metering valve is coupled to receive hydraulic fluid and is operable, upon receipt of the hydraulic fluid, to adjust the area of the variable area flow orifice based in part on the pressure of the hydraulic fluid. The actuator is coupled to receive the fuel flow command signals and hydraulic fluid from one or more hydraulic fluid sources. The actuator is operable, upon receipt of the fuel flow command signals and the hydraulic fluid, to supply variable pressure hydraulic fluid to the fuel metering valve. The fail-fixed valve is disposed in fluid communication between the metering valve actuator and the fuel metering valve. The fail-fixed valve is movable between a first position, in which the fuel metering valve receives the variable pressure hydraulic fluid from the metering valve actuator, and a second position, in which fuel metering valve does not receive the variable pressure hydraulic fluid from the metering valve actuator. The flow increase valve is in fluid communication with the fuel metering valve, and is adapted to receive hydraulic fluid at a first pressure from a first hydraulic fluid source and to selectively couple the fuel metering valve to the first hydraulic fluid source to thereby increase the area of the variable area flow orifice. The flow decrease valve is in fluid communication with the fuel metering valve, and is adapted to receive hydraulic fluid at a second pressure from a second hydraulic fluid source and to selectively couple the fuel metering valve to the second hydraulic fluid source to thereby decrease the area of the variable area flow orifice.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
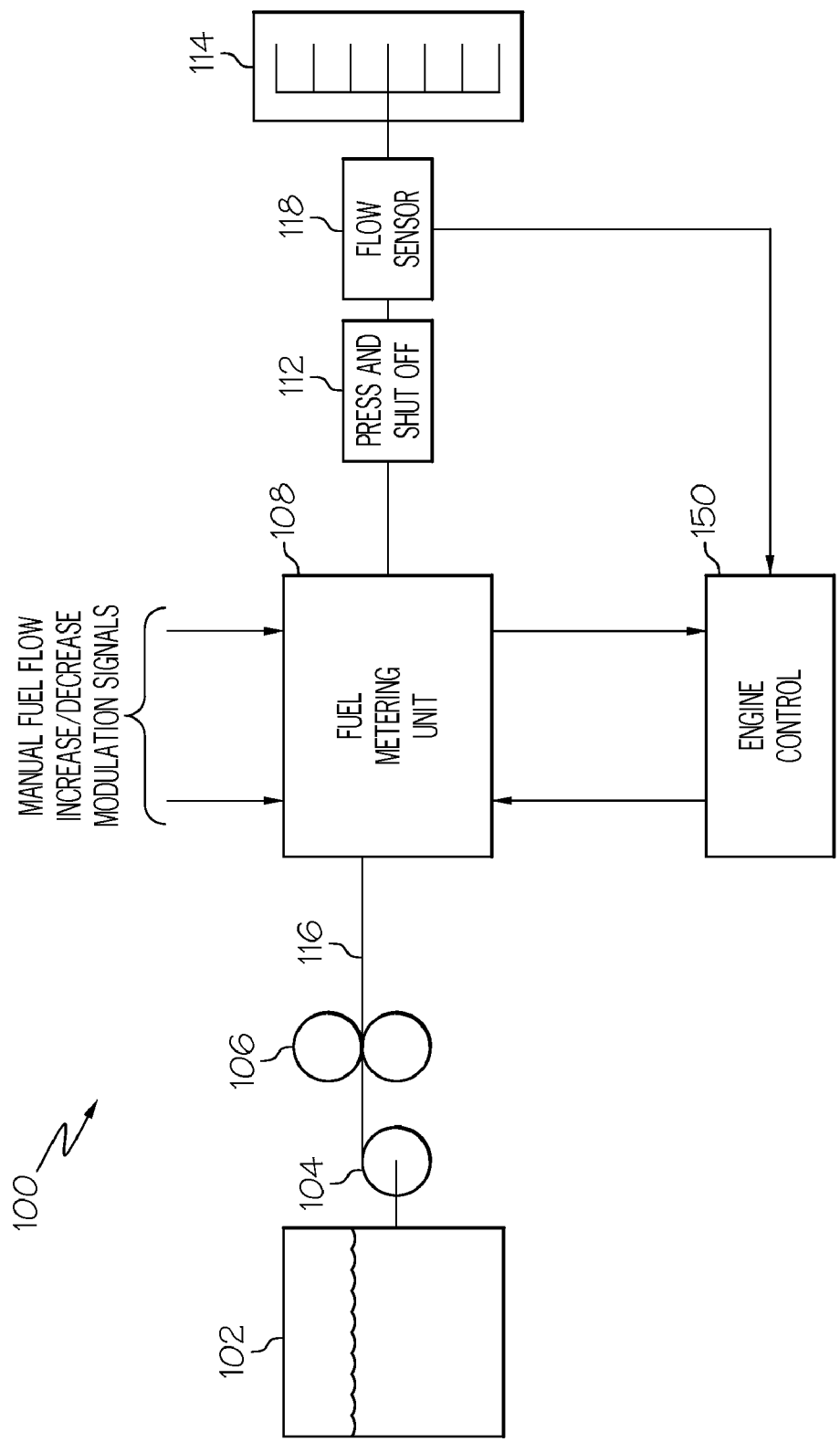
FIG. 1 is a simplified schematic diagram of an exemplary embodiment of a fuel delivery and control system for a gas turbine engine.

A simplified schematic diagram of one embodiment of a fuel delivery and control system for a gas turbine engine, such as a turbofan jet aircraft engine, is depicted in FIG. 1. The system 100 includes a fuel source 102, one or more pumps 104, 106, a fuel metering unit 108, and an engine control 150. The fuel source 102, which is preferably implemented as a tank, stores fuel that is to be supplied to a gas turbine engine combustor 114. A supply line 116 is coupled to the fuel source 102 and, via the just-mentioned pumps 104, 106 and fuel metering unit 108, delivers the fuel to the combustor 114. It is noted that the supply line 116 is, for convenience, depicted and described with a single reference numeral. However, it will be appreciated that the system is implemented using separate sections of piping, though a single section is certainly not prohibited.

Each of the one or more pumps 104, 106 is positioned in flow-series in the supply line 116 and take a suction on the fuel source 102. In the depicted embodiment, two pumps are used and include a booster pump 104, such as a relatively low horsepower centrifugal pump, and a high pressure pump 106, such as a positive displacement pump. The booster pump 104 takes a suction directly on the fuel source 102 and provides sufficient suction head for the high pressure pump 106. The high pressure pump 106 then supplies the fuel at a relatively high pressure to the remainder of the supply line 116.

The fuel metering unit 108 is positioned in flow-series in the supply line 116 downstream of the high pressure pump 106. The fuel metering unit 108 is coupled to receive fuel flow command signals supplied from the engine control 150. The fuel metering unit 108 is operable, in response to the fuel flow command signals, to control the flow of fuel to the gas turbine engine combustor 114. The fuel metering unit 108 is additionally coupled to selectively receive manual flow increase or flow decrease modulation signals from a remote source, such as an aircraft cockpit. The fuel metering unit 108 is also responsive to the manual modulation signals to control the flow of fuel to the gas turbine engine combustor 114. A more detailed description of the configuration and operation of the fuel metering unit 108, and the conditions under which it receives and responds to the manual flow modulation signals, will be provided further below. Before doing so, however, a description of the remainder of the depicted fuel supply system will, for completeness, be provided.

In the depicted embodiment, two additional major components are positioned in flow-series in the supply line 116 between the fuel metering unit 108 and the combustor 114. These two major components are a pressurizing and shutoff valve 112 and a flow sensor 118. The pressurizing-and-shutoff valve 112 functions to ensure a minimum system pressure magnitude is in the supply line 116 downstream of the fuel metering unit 108, and shuts when the pressure falls below this minimum pressure magnitude. The flow sensor 118 measures the fuel flow rate to the combustor 114 and generates a flow signal representative of the measured flow rate.

Although not depicted in FIG. 1, it will be appreciated that the system 100, in some embodiments may additionally include a bypass flow line. The bypass flow line, if included, is preferably connected to the supply line 116 between the high pressure pump 106 and the fuel metering unit 108, and bypasses a portion of the fuel in the supply line 116 back to the inlet of the high pressure pump 106, the inlet of the booster pump 104, or back to the fuel source 102. To do so, the bypass line may include a bypass valve that is positioned to selectively bypass fuel flow in the supply line 116 away from the metering valve 108, and thus the engine combustor 114. Similar to the fuel metering unit 108, the bypass valve is preferably controlled in response to valve command supplied from the engine control 150, which will now be described in more detail.

The engine control 150, which may be, for example, a Full Authority Digital Engine Controller (FADEC), controls the overall operation of the gas turbine engine (or engines), including the flow of fuel from the fuel source 102 to the combustors 114 in each engine. With respect to fuel supply to the combustors 114, the engine control 150 receives various input signals and supplies the fuel flow command signals to the fuel metering unit 108 to thereby control the fuel flow rate to the combustor 114.

Figure 2:
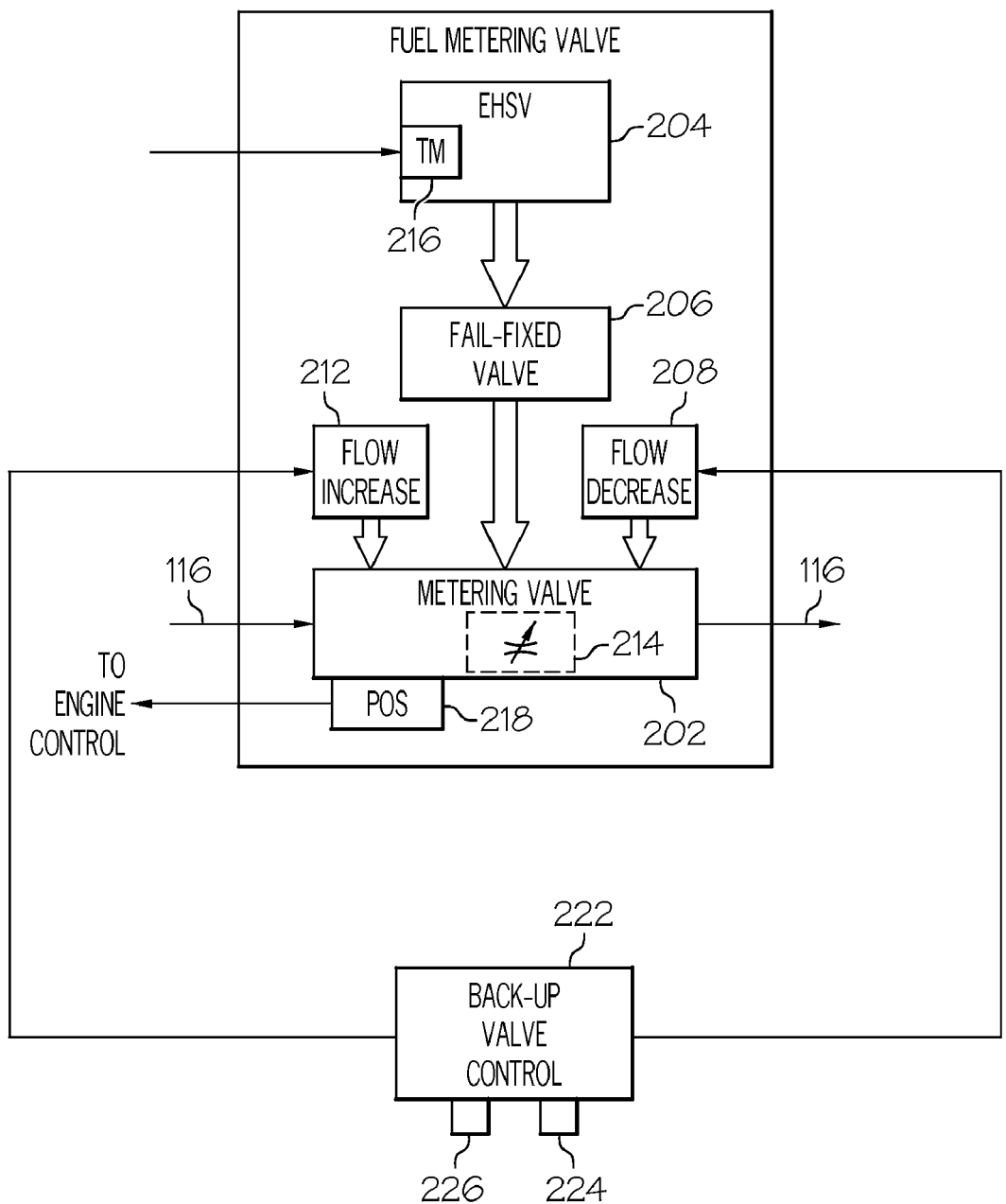
FIG. 2 is a functional block diagram of a fuel metering unit that may be used to implement the fuel delivery and control system of FIG. 1.

Turning now to FIG. 2, in which the fuel metering unit 108 is depicted in more detail in functional block diagram form, the fuel metering unit 108 will be described in more detail. The fuel metering unit 108 includes a fuel metering valve 202, a metering valve actuator 204, a fail-fixed valve 206, a flow decrease valve 208, and a flow increase valve 212. The fuel metering valve 202 is preferably a hydraulically-operated valve that defines a variable area flow orifice 214 through which a portion of the fuel in the supply line 116 flows. As will be described in more detail further below, the area of the variable area flow orifice 214 is adjusted in response to variable pressure hydraulic fluid that is supplied thereto, in part, from the metering valve actuator 204.

The metering valve actuator 204 is coupled to receive the fuel flow command signals supplied from the engine control 150 and hydraulic fluid from one or more non-illustrated hydraulic fluid sources. The metering valve actuator 204, in response to the fuel flow command signals, supplies the variable pressure hydraulic fluid to the fuel metering valve 202, to thereby adjust the area of the variable area flow orifice 214. In the depicted embodiment, the metering valve actuator 204 is an electro-hydraulic servo valve (EHSV) and includes, for example, a torque motor 216. The torque motor 216 is coupled to receive the fuel flow command signals from the engine controller 150 and, in response to the received fuel flow command signals, moves to a position that, for example, is proportional to the current in the fuel flow command signals. A non-illustrated spool is coupled to, and moves to a position in response to, movement of the torque motor 216. The position of the non-illustrated spool determines, at least in part, the pressure of the hydraulic fluid that is supplied to, and controls the position of, the fuel metering valve 302.

Before proceeding further, it is noted a position sensor 218 is preferably coupled to the metering valve 202. The position sensor 218 is operable to sense metering valve position and to supply a valve position signal representative thereof to the engine control 150. The position of the metering valve 202 is directly related to the area of the variable area flow orifice 214, which is directly related to the fuel flow rate to the combustor 114. The position sensor 218 is preferably a dual channel linear variable differential transformer (LVDT), but could be any one of numerous position sensing devices known in the art. For example, the position sensor 218 could be a rotary variable differential transformer (RVDT), an optical sensor, or a float-type sensor, just to name a few.

The fail-fixed valve 206 is disposed in fluid communication between the metering valve actuator 204 and the fuel metering valve 202, and is movable between at least a first position and a second position. In the first position, the fail-fixed valve 206 is configured such that the fuel metering valve 202 receives the variable pressure hydraulic fluid from the metering valve actuator 204. In the second position, the fail-fixed valve is configured such that the fuel metering valve 202 does not receive the variable pressure hydraulic fluid from the metering valve actuator 204. More specifically, and as will be described in more detail further below, when the fail-fixed valve 206 is in the second position, hydraulic fluid at a fixed pressure is supplied to the fuel metering valve 202. As a result, the area of the variable area flow orifice 214 will remain fixed. It will be appreciated that when the fail-fixed valve 206 is in the second position, the area of the variable area flow orifice 214 will remain fixed unless the flow decrease valve 208 or the flow increase valve 212 are operated.

The flow decrease valve 208 and the flow increase valve 212 are each in fluid communication with the fuel metering valve 202, and are each coupled to receive hydraulic fluid. The flow decrease valve 208 is coupled to receive hydraulic fluid at a first pressure from a non-illustrated first hydraulic fluid source, and the flow increase valve 212 is coupled to receive hydraulic fluid at a second pressure from a non-illustrated second hydraulic fluid source. As will be described in more detail further below, in a particular preferred embodiment the first hydraulic fluid source is a regulated pressure supplied from the fuel supply line inlet to the fuel metering unit 108, and the second hydraulic fluid source is a lower pressure hydraulic fluid source such as, for example, the booster pump 104 discharge. No matter the specific sources of the hydraulic fluid supplied to the flow decrease and flow increase valves 208, 212, it will be appreciated that the first pressure is greater than the second pressure. For example, in one particular embodiment, the first pressure may exceed the second pressure by about 250 psi.

The flow decrease valve 208 and flow increase valve 212 are also each operable to selectively couple the fuel metering valve 202 to the first hydraulic fluid source and the second hydraulic pressure source, respectively, to thereby vary the area of the variable area flow orifice 214. More specifically, the flow decrease valve 208 is responsive to the above-mentioned manual flow decrease modulation signals to couple the fuel metering valve 202 to the first hydraulic fluid source. The pressure of the first hydraulic fluid source is such that it will cause the area of the variable area flow orifice 214 to decrease, and thus the flow rate of fuel to the combustor 114 to decrease.

Similarly, the flow increase valve 212 is responsive to the above-mentioned manual flow increase modulation signals to couple the fuel metering valve 202 to the second hydraulic fluid source. The pressure of the second hydraulic fluid source is such that it will cause the area of the variable area flow orifice 214 to increase, and thus the flow rate of fuel to the combustor 114 to decrease.

As FIG. 2 additionally depicts, the manual flow increase and manual flow decrease modulation signals are supplied from a back-up valve control 222. Although the back-up valve control 222 may be variously configured to supply these signals, in the depicted embodiment, the back-up valve control 222 includes a flow decrease user interface 224 and a flow increase user interface 226. The flow decrease user interface 224 and flow increase user interface 226 are each adapted to receive input stimuli from a user, such as a pilot. The back-up valve control 222 is configured to supply the manual flow decrease modulation signals when input stimuli is supplied to the flow decrease user interface 224, and to supply the manual flow increase modulation signals input stimuli is supplied to the flow increase user interface 226.

Figure 3:
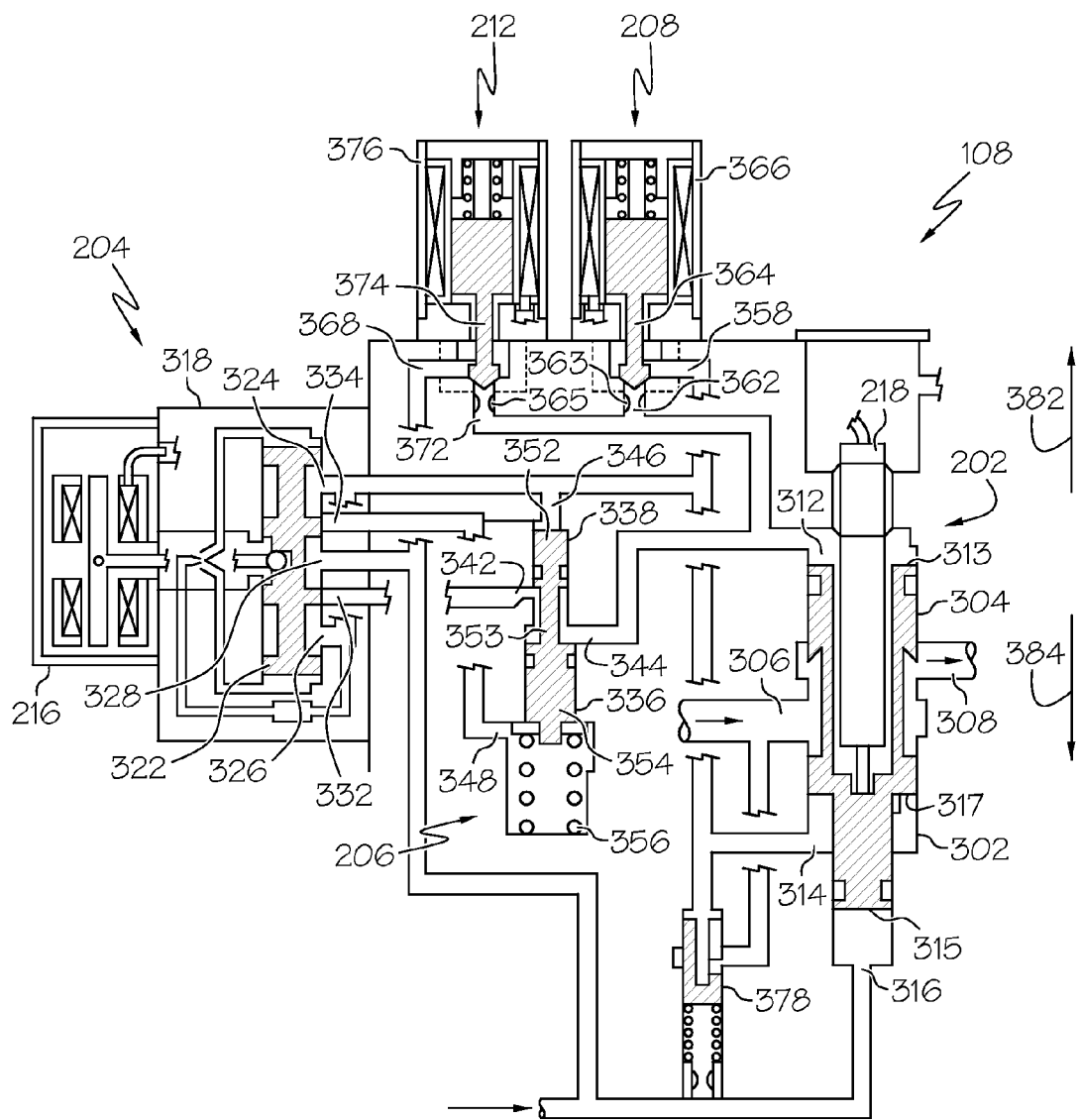
FIG. 3 is a detailed schematic diagram of the fuel metering unit of FIG. 2, depicting its configuration when electrical power is being supplied thereto.

Turning now to FIG. 3, a detailed schematic diagram of a particular physical implementation of the fuel metering unit 108 is depicted and will be described. In the depicted embodiment it is seen that the fuel metering valve 202 includes a sleeve 302 and a valve element 304. The metering valve sleeve 302 includes an inlet port 306, an outlet port 308, a first control port 312, a second control port 314, and a third control port 316. The metering valve sleeve inlet port 306 is coupled to receive the flow of fuel from the fuel source 102, via the pump 106, and the metering valve sleeve outlet port 308 is in fluid communication with the pressurizing and shutoff valve 112. The metering valve sleeve first control port 312 is in fluid communication with the fail-fixed valve 206, the metering valve sleeve second control port 314 is coupled to receive the hydraulic fluid at the first pressure from the above-mentioned first hydraulic fluid source, and the metering valve sleeve third control port 316 is coupled to receive the hydraulic fluid at the second pressure from the above-mentioned second hydraulic fluid source.

The valve element 304 is disposed within the sleeve 302 and together the valve element 304 and sleeve 302 define the variable area flow orifice 214. The valve element 304 is movable within the sleeve 302 to vary the area of the variable area flow orifice 214, to thereby control the flow of fuel to the engine combustor 114. In particular, the valve element 304 is configured to move in response to the overall differential fluid pressure acting on the valve element 304 from the hydraulic fluid supplied to the metering valve sleeve first, second, and third control ports 312, 314, 316. More specifically, and as FIG. 3 additionally depicts, the valve element 304 includes a first end 313, a second end 315, and an annular control surface 317. Preferably, the cross sectional area of the valve element first end 313 is approximately equal to the combined cross section areas of the second end 315 and the annular control surface 317. The above-mentioned position sensor 218 is also depicted as being coupled to the valve element 304.

The metering valve actuator 204, as described above, is implemented as an EHSV, and thus includes the previously mentioned torque motor 216. The metering valve actuator 204 additionally includes a main body 318 and a spool 322. The main body 318 includes three fluid inlet ports—a first fluid inlet port 324, a second fluid inlet port 326, and a third fluid inlet port 328—and two fluid outlet ports—a first fluid outlet port 332 and a second fluid outlet port 334. The first and second fluid inlet ports 324, 326 are in fluid communication with each other and are each coupled to receive hydraulic fluid from the first hydraulic fluid source, and the third fluid inlet port 328 is coupled to receive hydraulic fluid from the second hydraulic fluid source. The first fluid outlet port 332 and the second fluid outlet port 334 are both in fluid communication with the fail-fixed valve 206.

The spool 322 is disposed within the main body 318 and, in a known manner, is movable, in response to input stimuli supplied thereto from the torque motor 216, from a steady-state position to a control position, and then back to the steady-state position. In the steady-state position, which is the position depicted in FIG. 3, the first fluid inlet port 324 is in fluid communication with the second fluid outlet port 334, and the spool 322 isolates the first fluid outlet port 332 from both the second fluid inlet port 326 and the third fluid inlet port 328. When the spool 322 is moved from the steady-state position, in response to the input stimuli supplied from the torque motor 216, the first fluid outlet port 332 is fluidly communicated with either the second fluid inlet port 326 (and thus effectively the first fluid inlet port 324) or the third fluid inlet port 328, depending upon the direction the spool 322 is moved. Moreover, in the unlikely event that electrical power to the torque motor 216 is lost or becomes otherwise unavailable, the torque motor 216 is configured to move the spool 322 to the position depicted in FIG. 4. In this position, the first fluid outlet port 332 is in fluid communication with the second fluid inlet port 326

The fail-fixed valve 206 includes a sleeve 336 and a fail-fixed valve element 338. The sleeve 336 includes an inlet port 342, an outlet port 344, a first control port 346, and a second control port 348. The fail-fixed valve sleeve inlet port 342 is in fluid communication with the metering valve actuator main body first fluid outlet port 332, and the fail-fixed valve sleeve outlet port 344 is in fluid communication with the fuel metering valve sleeve first control port 312. The fail-fixed valve sleeve first control port 346 is in fluid communication with the metering valve actuator main body first fluid inlet port 312 and the first hydraulic fluid source, and the fail-fixed valve sleeve second control port 348 is in fluid communication with the metering valve actuator main body second fluid outlet port 334.

The fail-fixed valve element 338 is disposed within the fail-fixed valve sleeve 336, and includes a first end 352, a second end 354, and a reduced-diameter central section 353. The fail-fixed valve element 338 is movable within the fail-fixed valve sleeve 336 between the previously-mentioned first and second positions, partially in response to a differential fluid pressure between the fail-fixed valve element first and second ends 352, 354, and thus the fluid pressure differential between the fail-fixed valve sleeve first and second control ports 346, 348. In the first position, which is the position depicted in FIG. 3, the fail-fixed valve element 338 is positioned such that the fail-fixed valve sleeve inlet port 342 is in fluid communication with the fail-fixed valve sleeve outlet port 344. In the second position, which is the position depicted in FIG. 4, the fail-fixed valve sleeve inlet port 342 is fluidly isolated from the fail-fixed valve sleeve outlet port 344 and, as previously noted, hydraulic fluid at a fixed pressure will be supplied to the fuel metering valve first control port 312.

Figure 4:
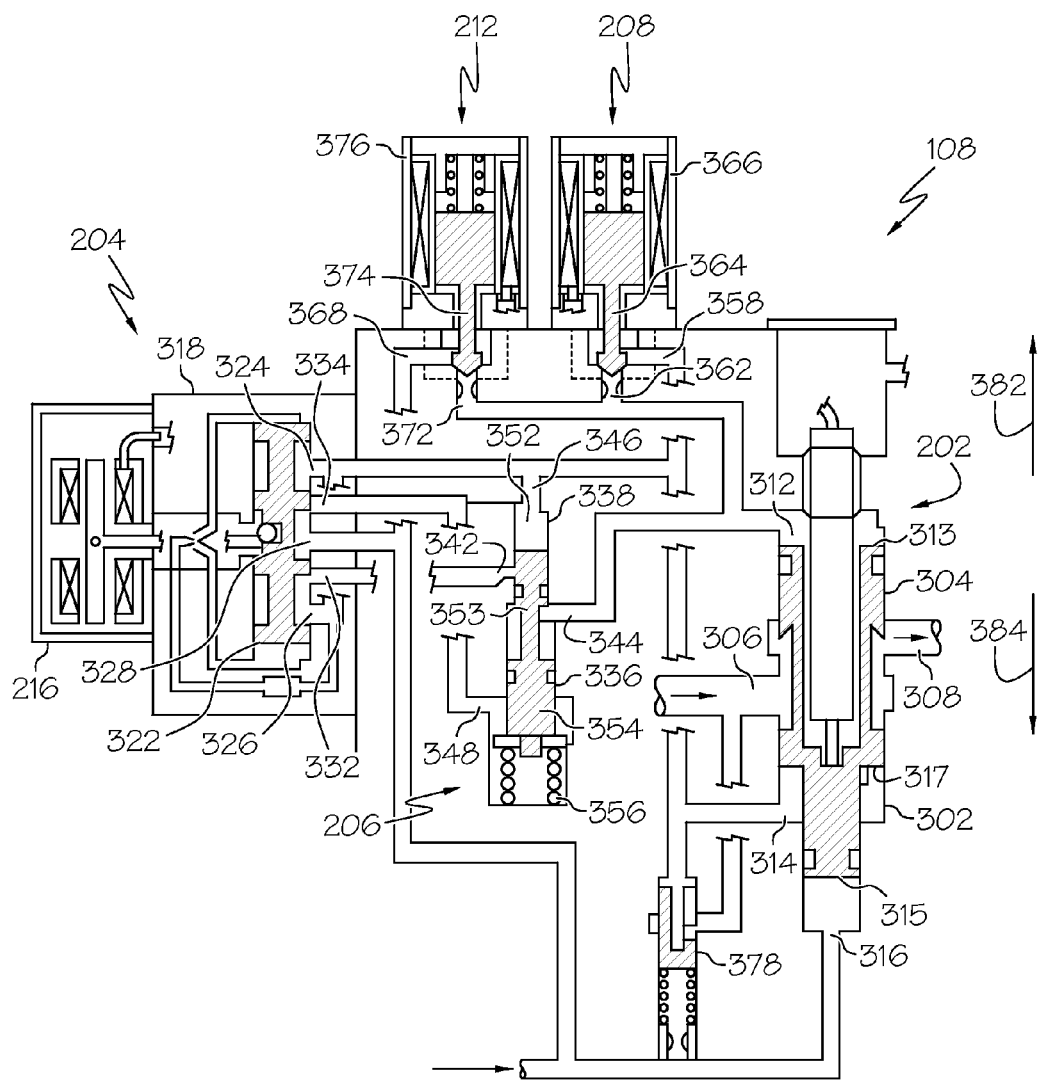
FIG. 4 is a detailed schematic diagram of the fuel metering unit of FIG. 2, depicting its configuration when electrical power thereto has been interrupted.

As FIGS. 3 and 4 also depict, the fail-fixed valve 206 additionally includes a spring 356. The spring 356 is disposed within the fail-fixed valve sleeve 324 and is configured to supply a spring bias force that urges the fail-fixed valve element 338 toward the first position. In the depicted embodiment the spring 344 is disposed between the fail-fixed valve sleeve 324 and the fail-fixed valve element second end 342. It will be appreciated, however, that the spring 344 could be alternately disposed to supply the bias force to the fail-fixed valve element 338.

The flow decrease valve 208 includes a first flow port 358, a second flow port 362, a flow increase valve element 364, and a flow increase valve actuator 366. The flow decrease valve first flow port 358 is coupled to receive the hydraulic fluid at the first pressure from the above-mentioned first hydraulic fluid source, and the second flow port 362 is in fluid communication with the fuel metering valve first control port 312. The flow decrease valve element 364 is disposed between the flow decrease valve first and second flow ports 358, 362 and is movable between a closed position and an open position. When the flow decrease valve element 364 is in the closed position, which is the position depicted in FIG. 3, the flow decrease valve first flow port 358 is fluidly isolated from the flow decrease valve second flow port 362. Conversely, when the flow decrease valve element 364 is in an open position, the flow decrease valve first flow port 358 is in fluid communication with the flow decrease valve second flow port 362.

The flow decrease valve element 364 is moved between the closed and open positions by the flow decrease valve actuator 366. The flow decrease valve actuator 366 is coupled to the flow decrease valve element 364 and is coupled to selectively receive the previously described flow decrease valve command signals. The flow decrease valve actuator 366, in response to the flow decrease valve command signals, selectively moves the flow decrease valve element 364 to either the closed position or an open position. The flow decrease valve actuator 366 may be implemented using any one of numerous types of actuators, including any one of numerous types of electromechanical, electro-pneumatic, and electro-hydraulic actuators. In the depicted embodiment, however, it is implemented using a solenoid.

The flow increase valve 212 is configured substantially similar to the flow decrease valve 208, and thus also includes a first flow port 368, a second flow port 372, a flow increase valve element 374, and a flow increase valve actuator 376. The flow increase valve first flow port 368 is coupled to receive the hydraulic fluid at the second pressure from the above-mentioned second hydraulic fluid source, and the second flow port 372 is in fluid communication with the fuel metering valve first control port 312. The flow increase valve element 374 is disposed between the flow increase valve first and second flow ports 368, 372 and is movable between a closed position and an open position. When the flow increase valve element 374 is in the closed position, which is the position depicted in FIG. 3, the flow increase valve first flow port 368 is fluidly isolated from the flow increase valve second flow port 372. Conversely, when the flow increase valve element 374 is in an open position, the flow increase valve first flow port 368 is in fluid communication with the flow increase valve second flow port 372.

The flow increase valve element 374 is moved between the closed and open positions by the flow increase valve actuator 376. The flow increase valve actuator 376 is coupled to the flow increase valve element 374 and is coupled to selectively receive the previously described flow increase valve command signals. The flow increase valve actuator 376, in response to the flow increase valve command signals, selectively moves the flow increase valve element 374 to either the closed position or an open position. The flow increase valve actuator 376, similar to the flow decrease valve actuator 366, may be implemented using any one of numerous types of actuators, including any one of numerous types of electromechanical, electro-pneumatic, and electro-hydraulic actuators. In the depicted embodiment, however, it is implemented using a solenoid.

Before proceeding further, it is additionally seen that the depicted fuel metering unit 108 also includes a pressure regulator 378. The pressure regulator 378 is coupled to receive the flow of fuel from the fuel source 102, via the pump 106, and to receive the hydraulic fluid at the second pressure from the above-mentioned second hydraulic fluid source. The pressure regulator 378 is configured to regulate and supply hydraulic fluid at the first pressure to the metering valve sleeve second control port 314, to the metering valve actuator main body first and second fluid inlet ports 324, 326, to the fail-fixed valve sleeve first control port 346, and to the flow decrease and flow increase valves 208, 212.

Having described the fuel metering unit 108 from a structural standpoint, and having generally described its overall function, a more detailed description of its function will now be provided. In doing so, reference should be made to FIGS. 3 and 4, as needed, beginning first with FIG. 3, which depicts the fuel metering unit 108 during normal operation, with the metering valve actuator spool 322 in its steady-state position. In this position, the metering valve actuator main body first fluid outlet port 332 is isolated from both the main body second and third fluid inlet ports 326, 328, and the main body second fluid outlet port 334 is in fluid communication with the main body first fluid inlet port 324. Because the fail-fixed valve sleeve second control port 348 is in fluid communication with the metering valve actuator main body second fluid outlet port 334, the fluid pressures at the fail-fixed valve sleeve first and second control ports 346, 348 are equal, or at least substantially equal. This, in combination with the fact that the diameter of the fail-fixed valve element second end 354 is larger than that of the first end 352, and that the spring 356 is supplying the bias force, ensures that the fail fixed valve element 338 is in the first position. It will thus be appreciated that as long as the system pressures remain relatively constant, the position of the metering valve 202 will remain unchanged.

If the engine control 150 determines that the area of the variable flow orifice 214 needs to decrease, it sends appropriate fuel flow command signals to the metering valve actuator 204. In response to these signals, the torque motor 216 moves the metering valve actuator spool 322 in the direction indicated by direction arrow 382. When the spool 322 moves in this direction, the metering valve actuator main body first fluid outlet port 332 is placed in fluid communication with the second fluid inlet port 326. As a result, hydraulic fluid at the first fluid pressure is supplied to the metering valve sleeve first control port 312. It is noted that during normal operation, the combined fluid pressures acting on the metering valve second end 315 and the annular control surface 317 is a fluid pressure value between the first and second fluid pressures. Thus, when hydraulic fluid at the first fluid pressure is supplied to the metering valve sleeve first control port 312, the valve element 304 moves in the direction of arrow 384, thereby decreasing the area of the variable area flow orifice 214 and concomitantly decreasing fuel flow to the engine combustor 114. When the desired fuel flow rate is achieved, the engine control 150 commands the torque motor 216 to move the metering valve actuator spool 322 back to the steady-state position.

Conversely, if the engine control 150 determines that the area of the variable flow orifice 214 needs to increase, it sends fuel flow command signals to the metering valve actuator 204 that cause the torque motor 216 to move the metering valve actuator spool 322 in the direction indicated by direction arrow 384. When the spool 322 moves in this direction, the metering valve actuator main body first fluid outlet port 332 is placed in fluid communication with the third fluid inlet port 328. As a result, hydraulic fluid at the second fluid pressure is supplied to the metering valve sleeve first control port 312. The valve element 304 thus moves in the direction of arrow 382, thereby increasing the area of the variable area flow orifice 214 and concomitantly increasing fuel flow to the engine combustor 114. Again, when the desired fuel flow rate is achieved, the engine control 150 commands the torque motor 216 to move the metering valve actuator spool 322 back to the steady-state position.

As noted above, in the unlikely event that electrical power to the torque motor 216 is lost or becomes otherwise unavailable, the torque motor 216 is configured to move the metering valve actuator spool 322 to the position depicted in FIG. 4. In this position, the metering valve actuator main body first fluid outlet port 332 is in fluid communication with the second fluid inlet port 326, and the metering valve actuator main body second fluid outlet port 334 is in fluid communication with the third fluid inlet port 328. As a result, hydraulic fluid at the second pressure is supplied to the fail-fixed valve sleeve second control port 348, while hydraulic fluid at the first pressure continues to be supplied to the fail-fixed valve sleeve first control port 346. The first pressure exceeds the second pressure by a magnitude that is sufficient to overcome the combined force of the second pressure and the spring 356 acting on the fail-fixed valve element second end 354 and move the fail-fixed valve element 338 to the second position.

With the fail-fixed valve element 338 in the second position, the fluid passage between the fail-fixed valve sleeve outlet port 344 and the metering valve sleeve first control port 312 is sealed. Because the hydraulic fluid in this fluid passage is relatively incompressible, and the fluid passage and fail-fixed valve element 338 and metering valve element 304 are suitably sealed, the hydraulic fluid will not leak from this fluid passage, and the metering valve element 304 will remain fixed in its position. This position is the same, or at least substantially the same, as the position the metering valve element 304 was in when electrical power to the metering valve actuator 204 was interrupted.

It may be appreciated, upon comparison of FIGS. 3 and 4, that when the torque motor 216 moves the metering valve actuator spool 322 to the position depicted in FIG. 4, the metering valve actuator main body first fluid outlet port 328 is in fluid communication with the second fluid inlet port 326. Thus, hydraulic fluid at the first pressure is supplied to the fail-fixed valve sleeve inlet port 344, and thus the metering valve sleeve first control port 312, for the amount of time it takes the fail-fixed valve element 338 to move to the second position. As previously noted, the first pressure will tend to move the metering valve element 304 in the direction of arrow 384, away from the position it occupied when the power interruption occurred. However, as FIGS. 3 and 4 also depict, fail-fixed valve element second end 354 has a larger diameter than that of the fail-fixed valve first end 352, and the corresponding portion of the fail-fixed sleeve 336 that surrounds the fail-fixed valve second end 354 is larger than the portion of the fail-fixed sleeve 336 that surrounds the fail-fixed valve element first end 352. Thus, as the fail-fixed valve element 338 shifts to the second position, the volume surrounding the fail-fixed valve element reduced-diameter central section 353 increases. The relative diameters of the fail-fixed valve 206 and the stroke of the fail-fixed valve element 338 are selected so that the increase in volume surrounding the reduced-diameter central section 353 is sufficient to compensate for the transient flow increase resulting from the metering valve actuator spool 322 movement. In this manner, although briefly displaced, the metering valve element 304 will return to substantially the same position it occupied when electrical power to the metering valve actuator 204 was interrupted.

It will additionally be appreciated that as long as electrical power to the metering valve actuator 204 is unavailable, the metering valve 202 will remain in a fixed position, unless the flow decrease valve 208 or flow increase valve 212 are operated. In particular, if a user, such as a pilot, wishes to decrease fuel flow to the engine combustor 114, then the user will supply appropriate input stimuli to the flow decrease user interface 224. As noted above, the back-up valve control 222, in response to the supplied input stimuli, will supply manual flow decrease modulation signals to the fuel decrease valve 208. Upon receipt of the manual flow decrease modulation signals, the flow decrease valve actuator 366 will move the flow decrease valve element 364 to an open position. In the open position, hydraulic fluid at the first pressure flows through the flow decrease valve first and second ports 358, 362, via a rate limit orifice 363, to the metering valve sleeve first control port 312. As a result, the metering valve element 304 will move in the direction of arrow 384, thereby reducing the area of the variable area flow orifice 214, and concomitantly decreasing fuel flow to the combustor 114. When the desired fuel flow rate is achieved, the user will no longer supply input stimuli to the flow decrease user interface 224, the back-up valve control 322 will cease supplying the manual flow decrease modulation signals to the flow decrease valve actuator 366, and the flow decrease valve element 364 will return to its closed position.

If a user wishes to increase fuel flow to the engine combustor 114 while electrical power is unavailable to the metering valve actuator 204, then the user will supply appropriate input stimuli to the flow increase user interface 226. As noted above, the back-up valve control 222, in response to the supplied input stimuli, will supply manual flow increase modulation signals to the fuel increase valve 212. Upon receipt of the manual flow increase modulation signals, the flow increase valve actuator 376 will move the flow increase valve element 374 to an open position. In the open position, hydraulic fluid at the second pressure flows through the flow increase valve first and second flow ports 368, 372, via a rate limit orifice 365, to the metering valve sleeve first control port 312. As a result, the metering valve element 304 will move in the direction of arrow 382, thereby increasing the area of the variable area flow orifice 214, and concomitantly increasing fuel flow to the combustor 114. When the desired fuel flow rate is achieved, the user will no longer supply input stimuli to the flow increase user interface 226, the back-up valve control 322 will cease supplying the manual flow increase modulation signals to the flow increase valve actuator 376, and the flow increase valve element 374 will return to its closed position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuel metering unit, comprising:
   a fuel metering valve coupled to receive a flow of fuel from a fuel source and having a variable area flow orifice through which fuel from the fuel source flows, the fuel metering valve coupled to receive hydraulic fluid and operable, upon receipt of the hydraulic fluid, to adjust the area of the variable area flow orifice based in part on the pressure of the hydraulic fluid;
   a metering valve actuator coupled to receive fuel flow command signals and hydraulic fluid from one or more hydraulic fluid sources, the metering valve actuator operable, upon receipt of the fuel flow command signals and the hydraulic fluid, to supply variable pressure hydraulic fluid to the fuel metering valve;
   a fail-fixed valve disposed in fluid communication between the metering valve actuator and the fuel metering valve, the fail-fixed valve movable between a first position, in which the fuel metering valve receives the variable pressure hydraulic fluid from the metering valve actuator, and a second position, in which fuel metering valve does not receive the variable pressure hydraulic fluid from the metering valve actuator;
   a flow increase valve in fluid communication with the fuel metering valve, the flow increase valve adapted to (i) receive hydraulic fluid at a first pressure from a first hydraulic fluid source and (ii) selectively couple the fuel metering valve to the first hydraulic fluid source to thereby increase the area of the variable area flow orifice; and
   a flow decrease valve in fluid communication with the fuel metering valve, the flow decrease valve adapted to (i) receive hydraulic fluid at a second pressure from a second hydraulic fluid source and (ii) selectively couple the fuel metering valve to the second hydraulic fluid source to thereby decrease the area of the variable area flow orifice.

2. The fuel metering unit of claim 1, wherein the fuel metering valve comprises:
   a sleeve having an inlet port, an outlet port, a first control port, and a second control port, the inlet port adapted to receive the flow of fuel from the fuel source, the first control port in fluid communication with the fail-fixed valve, the second control port adapted to receive the hydraulic fluid at the first pressure from the first hydraulic fluid source; and
   a valve element disposed within the sleeve and movable therein, in response to a differential fluid pressure between the first control port and the second control port, to thereby adjust the variable area flow orifice.

3. The fuel metering unit of claim 2, wherein:
   the flow increase valve comprises:
      a first flow port adapted to receive the hydraulic fluid at the first pressure from the first hydraulic fluid source,
      a second flow port in fluid communication with the fuel metering valve first control port,
      a flow increase valve element disposed between the flow increase valve first and second flow ports and movable between a closed position, in which the flow increase valve first flow port is not in fluid communication with the flow increase valve second flow port, and an open position, in which the flow increase valve first flow port is in fluid communication with the flow increase valve second flow port, and
      a flow increase valve actuator coupled to the flow increase valve element and adapted to receive flow increase valve command signals, the flow increase valve actuator operable, in response to the flow increase valve command signals, to selectively move the flow increase valve element to the closed position or an open position; and the flow decrease valve comprises:
a first flow port adapted to receive the hydraulic fluid at the second pressure from the second hydraulic fluid source,
a second flow port in fluid communication with the fuel metering valve first control port,
a flow decrease valve element disposed between the flow decrease valve first and second flow ports and movable between a closed position, in which the flow decrease valve first flow port is not in fluid communication with the flow decrease valve second flow port, and an open position, in which the flow decrease valve first flow port is in fluid communication with the flow decrease valve second flow port, and
a flow decrease valve actuator coupled to the flow decrease valve element and adapted to receive flow decrease valve command signals, the flow decrease valve actuator operable, in response to the flow decrease valve command signals, to selectively move the flow decrease valve element to the closed position or an open position.

4. The fuel metering unit of claim 3, wherein:
the flow increase valve command signals and the flow decrease command signals are each pulse width modulation (PWM) signals; and
the flow increase valve actuator and the flow decrease valve actuator each comprise a solenoid responsive to PWM signals to move the flow increase valve element and the flow decrease valve element, respectively.

5. The fuel metering unit of claim 2, wherein the metering valve actuator comprises:
a main body having first and second inlet ports and first and second outlet ports, the first inlet port adapted to receive hydraulic fluid from the first hydraulic fluid source, the second inlet port adapted to receive hydraulic fluid from the second hydraulic fluid source, the first outlet port and the second outlet port in fluid communication with the fail-fixed valve;
a spool disposed within the main body and movable, in response to input stimuli, to selectively fluidly communicate the first fluid outlet port with either the first fluid inlet port or the second fluid inlet port;
a torque motor coupled to receive the fuel flow command signals and operable, in response thereto, to supply the input stimuli to the spool.

6. The fuel metering unit of claim 5, wherein:
the torque motor is further operable, upon being de-energized, to supply a power-loss input stimuli to the spool; and
the spool, in response to the power-loss input stimuli, moves to a position in which (i) the first fluid inlet port is in fluid communication with the second fluid outlet port and (ii) the second fluid inlet port is in fluid communication with the first fluid outlet port.

7. The fuel metering unit of claim 6, wherein the fail-fixed valve comprises:
a sleeve including an inlet port, an outlet port, a first control port, and a second control port, the fail-fixed valve sleeve inlet port in fluid communication with the metering valve actuator main body first fluid outlet port, the fail-fixed valve sleeve outlet port in fluid communication with the fuel metering valve first control port, the fail-fixed valve sleeve first control port in fluid communication with the metering valve actuator main body first fluid inlet port, the fail-fixed valve sleeve second control port in fluid communication with the metering valve actuator main body second fluid outlet port; and
a fail-fixed valve element disposed within the fail-fixed valve sleeve and movable, partially in response to a differential fluid pressure between the fail-fixed valve sleeve first control port and the fail-fixed valve sleeve second control port, between a closed position, in which the fail-fixed valve sleeve inlet port is not in fluid communication with the fail-fixed valve sleeve outlet port, and an open position, in which the fail-fixed valve sleeve inlet port is in fluid communication with the fail-fixed valve sleeve outlet port.

8. The fuel metering unit of claim 7, further comprising:
a spring disposed within the sleeve and configured to supply a spring bias force that urges the fail-fixed valve element toward the closed position.

9. The fuel metering unit of claim 7, further comprising:
a pressure regulator adapted to receive hydraulic fluid from the second hydraulic fluid source and supply the hydraulic fluid, at a regulated pressure, to the metering valve actuator main body second fluid inlet port and the fail-fixed valve sleeve first control port.

10. A gas turbine engine fuel supply system, comprising:
an engine control operable to supply fuel flow command signals;
a fuel supply line having an inlet and an outlet, the inlet adapted to receive fuel from a fuel source, the outlet adapted to supply the fuel to a gas turbine engine combustor; and
a fuel metering unit disposed in flow series in the fuel supply line, the fuel metering coupled to receive the fuel flow command signals and operable, in response thereto, to control fuel flow from the fuel source to the gas turbine engine combustor, the fuel metering unit comprising:
a fuel metering valve coupled to receive the flow of fuel from the fuel source and having a variable area flow orifice through which fuel from the fuel source flows, the fuel metering valve coupled to receive hydraulic fluid and operable, upon receipt of the hydraulic fluid, to adjust the area of the variable area flow orifice based in part on the pressure of the hydraulic fluid,
an actuator coupled to receive the fuel flow command signals and hydraulic fluid from one or more hydraulic fluid sources, the actuator operable, upon receipt of the fuel flow command signals and the hydraulic fluid, to supply variable pressure hydraulic fluid to the fuel metering valve,
a fail-fixed valve disposed in fluid communication between the actuator and the fuel metering valve, the fail-fixed valve movable between a first position, in which the fuel metering valve receives the variable pressure hydraulic fluid from the actuator, and a second position, in which fuel metering valve does not receive the variable pressure hydraulic fluid from the actuator,
a flow increase valve in fluid communication with the fuel metering valve, the flow increase valve adapted to (i) receive hydraulic fluid at a first pressure from a first hydraulic fluid source and (ii) selectively couple the fuel metering valve to the first hydraulic fluid source to thereby increase the area of the variable area flow orifice, and
a flow decrease valve in fluid communication with the fuel metering valve, the flow decrease valve adapted to (i) receive hydraulic fluid at a second pressure from a second hydraulic fluid source and (ii) selectively couple the fuel metering valve to the second hydraulic fluid source to thereby decrease the area of the variable area flow orifice.

11. The system of claim 10, wherein the flow increase valve and the flow decrease valve are responsive to flow increase valve commands and flow decrease valve command signals, respectively, and wherein the system further comprises:
   a back-up valve control in operable communication with the flow increase valve and the flow decrease valve, the back-up control unit adapted to receive input stimuli from a user and operable, in response thereto, to selectively supply the flow increase valve command signals and the flow decrease valve command signals.

12. The system of claim 11, further comprising:
   a flow increase user interface adapted to be responsive to the input stimuli; and
   a flow decrease user interface adapted to be responsive to the input stimuli,
   wherein the back-up control unit supplies (i) the flow increase valve commands when the input stimuli is supplied to the flow increase user interface and (ii) the flow decrease valve commands when the input stimuli is supplied to the flow decrease user interface.

13. The system of claim 11, wherein the back-up valve control is electrically independent of the engine control.

14. The system of claim 11, wherein the fuel metering valve comprises:
   a sleeve having an inlet port, an outlet port, a first control port, and a second control port, the inlet port adapted to receive the flow of fuel from the fuel source, the first control port in fluid communication with the fail-fixed valve, the second control port adapted to receive the hydraulic fluid at the first pressure from the first hydraulic fluid source; and
   a valve element disposed within the sleeve and movable therein, in response to a differential fluid pressure between the first control port and the second control port, to thereby adjust the variable area flow orifice.

15. The system of claim 14, wherein:
   the flow increase valve comprises:
      a first flow port adapted to receive the hydraulic fluid at the first pressure from the first hydraulic fluid source,
      a second flow port in fluid communication with the fuel metering valve first control port,
      a flow increase valve element disposed between the flow increase valve first and second flow ports and movable between a closed position, in which the flow increase valve first flow port is not in fluid communication with the flow increase valve second flow port, and an open position, in which the flow increase valve first flow port is in fluid communication with the flow increase valve second flow port, and
      a flow increase valve actuator coupled to the flow increase valve element and further coupled to receive the flow increase valve command signals, the flow increase valve actuator operable, in response to the flow increase valve command signals, to selectively move the flow increase valve element to the closed position or an open position; and
   the flow decrease valve comprises:
      a first flow port adapted to receive the hydraulic fluid at the second pressure from the second hydraulic fluid source,
      a second flow port in fluid communication with the fuel metering valve first control port,
      a flow decrease valve element disposed between the flow decrease valve first and second flow ports and movable between a closed position, in which the flow decrease valve first flow port is not in fluid communication with the flow decrease valve second flow port, and an open position, in which the flow decrease valve first flow port is in fluid communication with the flow decrease valve second flow port, and
      a flow decrease valve actuator coupled to the flow decrease valve element and further coupled to receive the flow decrease valve command signals, the flow decrease valve actuator operable, in response to the flow decrease valve command signals, to selectively move the flow decrease valve element to the closed position or an open position.

16. The system of claim 15, wherein:
   the flow increase valve command signals and the flow decrease command signals are each pulse width modulation (PWM) signals; and
   the flow increase valve actuator and the flow decrease valve actuator each comprise a solenoid responsive to PWM signals to move the flow increase valve element and the flow decrease valve element, respectively.

17. The system of claim 14, wherein the metering valve actuator comprises:
   a main body having first and second inlet ports and first and second outlet ports, the first inlet port adapted to receive hydraulic fluid from the first hydraulic fluid source, the second inlet port adapted to receive hydraulic fluid from the second hydraulic fluid source, the first outlet port and the second outlet port in fluid communication with the fail-fixed valve;
   a spool disposed within the main body and movable, in response to input stimuli, to selectively fluidly communicate the first fluid outlet port with either the first fluid inlet port or the second fluid inlet port;
   a torque motor coupled to receive the fuel flow command signals and operable, in response thereto, to supply the input stimuli to the spool.

18. The system of claim 17, wherein:
   the torque motor is further operable, upon being de-energized, to supply a power-loss input stimuli to the spool; and
   the spool, in response to the power-loss input stimuli, moves to a position in which (i) the first fluid inlet port is in fluid communication with the second fluid outlet port and (ii) the second fluid inlet port is in fluid communication with the first fluid outlet port.

19. The system of claim 18, wherein the fail-fixed valve comprises:
   a sleeve including an inlet port, an outlet port, a first control port, and a second control port, the fail-fixed valve sleeve inlet port in fluid communication with the metering valve actuator main body first fluid outlet port, the fail-fixed valve sleeve outlet port in fluid communication with the fuel metering valve first control port, the fail-fixed valve sleeve first control port in fluid communication with the metering valve actuator main body first fluid inlet port, the fail-fixed valve sleeve second control port in fluid communication with the metering valve actuator main body second fluid outlet port;
   a fail-fixed valve element disposed within the fail-fixed valve sleeve and movable, partially in response to a differential fluid pressure between the fail-fixed valve sleeve first control port and the fail-fixed valve sleeve second control port, between a closed position, in which the fail-fixed valve sleeve inlet port is not in fluid communication with the fail-fixed valve sleeve outlet port, and an open position, in which the fail-fixed valve sleeve inlet port is in fluid communication with the fail-fixed valve sleeve outlet port; and a spring disposed within the sleeve and configured to supply a spring bias force that urges the fail-fixed valve element toward the closed position.

20. The system of claim 18, further comprising:

a pressure regulator adapted to receive hydraulic fluid from the second hydraulic fluid source and supply the hydraulic fluid, at a regulated pressure, to the metering valve actuator main body second fluid inlet port and the fail-fixed valve sleeve first control port.

* * * * *